United States Patent
Seeman

(10) Patent No.: US 10,673,339 B2
(45) Date of Patent: Jun. 2, 2020

(54) HYSTERETIC CONTROL FOR TRANSFORMER BASED POWER CONVERTERS

(71) Applicant: Texas Instruments Incorporated, Dallas, TX (US)

(72) Inventor: Michael D. Seeman, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 357 days.

(21) Appl. No.: 15/073,964

(22) Filed: Mar. 18, 2016

(65) Prior Publication Data
US 2017/0025961 A1 Jan. 26, 2017

Related U.S. Application Data

(60) Provisional application No. 62/195,865, filed on Jul. 23, 2015.

(51) Int. Cl.
*H02M 3/335* (2006.01)
*H02M 3/158* (2006.01)
(Continued)

(52) U.S. Cl.
CPC ......... *H02M 3/33546* (2013.01); *H02M 1/08* (2013.01); *H02M 3/1584* (2013.01);
(Continued)

(58) Field of Classification Search
CPC ......... H02M 3/33569; H02M 3/33592; H02M 3/33507; H02M 3/33546; H02M 1/08; H02M 2001/0009
See application file for complete search history.

(56) References Cited

U.S. PATENT DOCUMENTS 6,064,187 A * 5/2000 Redl ................ G05F 1/565
 323/224
6,211,657 B1 4/2001 Goluszek
(Continued)

FOREIGN PATENT DOCUMENTS

CN 1521931 A 8/2004
CN 101183836 A 5/2008
(Continued)

OTHER PUBLICATIONS

Rais Miftakhutdinov, "Synchronous buck regulator design using the TI TPS5211 high frequency hysteretic controller," Analog Applications Journal, Texas Instruments Incorporated, Nov. 10-13, 1999, accessed Mar. 15, 2016, http://www.ti.com/lit/an/slyt186/slyt186.pdf.
(Continued)

*Primary Examiner* — Yusef A Ahmed
(74) *Attorney, Agent, or Firm* — Mark Allen Valetti; Charles A. Brill; Frank D. Cimino

(57) ABSTRACT

Hysteretic control for power converters. In an example arrangement, an apparatus includes a converter for converting an input voltage to an output voltage including a transformer; at least one primary side driver switch coupled to supply current from an input voltage terminal to the primary side of the transformer; at least one inductor coupled between the secondary side of the transformer and the output voltage terminal; at least one secondary side switch coupled between the inductor and a ground potential; and a hysteretic controller coupled to supply a first on-time signal to the at least one primary side switch and a second on-time signal to the at least one secondary side switch, the hysteretic controller configured for sensing the output voltage and having at least one current input coupled for sensing
(Continued)

current flowing in the inductor and generating primary side driver switch on-time pulses to control the output voltage.

20 Claims, 9 Drawing Sheets

(51) Int. Cl.
 *H02M 1/08* (2006.01)
 *H02M 1/00* (2006.01)
(52) U.S. Cl.
 CPC ... *H02M 3/33507* (2013.01); *H02M 3/33592* (2013.01); *H02M 2001/0009* (2013.01); *Y02B 70/1475* (2013.01)

(56) References Cited

U.S. PATENT DOCUMENTS

| | | | | |
|---|---|---|---|---|
| 6,243,277 | B1* | 6/2001 | Sun | H02J 7/34 323/222 |
| 6,348,780 | B1 | 2/2002 | Grant | |
| 6,912,144 | B1* | 6/2005 | Clavette | H02M 3/1584 323/283 |
| 6,930,893 | B2 | 8/2005 | Vinciarelli | |
| 7,145,786 | B2 | 12/2006 | Vinciarelli | |
| 7,187,562 | B2 | 3/2007 | Stojcic | |
| 7,196,914 | B2 | 3/2007 | Ren et al. | |
| 7,800,921 | B2 | 9/2010 | Zhu et al. | |
| 7,903,433 | B2 | 3/2011 | Carpenter et al. | |
| 8,077,490 | B1* | 12/2011 | Prodic | H02M 3/157 323/282 |
| 8,866,464 | B2 | 10/2014 | Ragona et al. | |
| 9,484,832 | B2* | 11/2016 | Melanson | H02M 1/44 |
| 2001/0030879 | A1* | 10/2001 | Greenfeld | H02M 1/38 363/17 |
| 2002/0125869 | A1* | 9/2002 | Groom | H02M 3/1584 323/283 |
| 2003/0021128 | A1* | 1/2003 | Brkovic | H02M 1/36 363/17 |
| 2003/0086279 | A1* | 5/2003 | Bourdillon | H02M 3/33561 363/21.12 |
| 2003/0090237 | A1* | 5/2003 | Shenai | H02J 7/0052 320/139 |
| 2003/0102849 | A1* | 6/2003 | Schiff | H02M 3/1584 323/222 |
| 2004/0051510 | A1* | 3/2004 | Saggini | H02M 3/157 323/282 |
| 2004/0190314 | A1* | 9/2004 | Yoshida | H02M 3/285 363/65 |
| 2004/0257056 | A1* | 12/2004 | Huang | H02M 3/1588 323/282 |
| 2005/0017767 | A1* | 1/2005 | Huang | H02M 3/1588 327/110 |
| 2005/0184713 | A1* | 8/2005 | Xu | H02M 3/156 323/282 |
| 2006/0109698 | A1* | 5/2006 | Qu | H02M 3/33592 363/127 |
| 2006/0133116 | A1* | 6/2006 | Schaible | H02M 3/33592 363/17 |
| 2006/0181906 | A1 | 8/2006 | Batarseh et al. | |
| 2007/0013354 | A1* | 1/2007 | Mok | H02M 3/156 323/284 |
| 2007/0035281 | A1* | 2/2007 | Kuroiwa | H02M 3/156 323/222 |
| 2008/0088292 | A1* | 4/2008 | Stoichita | H02M 3/156 323/285 |
| 2009/0079408 | A1* | 3/2009 | Qiao | H02M 3/157 323/283 |
| 2009/0086512 | A1* | 4/2009 | Fahlenkamp | H02M 3/33592 363/21.06 |
| 2009/0322300 | A1* | 12/2009 | Melanson | H02M 3/1563 323/284 |
| 2010/0148738 | A1* | 6/2010 | Schiff | H02M 3/157 323/282 |
| 2010/0232180 | A1* | 9/2010 | Sase | H02M 3/33576 363/17 |
| 2010/0266875 | A1* | 10/2010 | Somogye | G05F 1/10 429/7 |
| 2011/0057632 | A1* | 3/2011 | Cheng | H02M 3/156 323/234 |
| 2011/0101951 | A1* | 5/2011 | Zhang | H02M 3/33592 323/305 |
| 2011/0133704 | A1* | 6/2011 | Zambetti | H02M 3/1584 323/212 |
| 2011/0194206 | A1* | 8/2011 | Sase | H02M 3/33592 360/75 |
| 2011/0205761 | A1* | 8/2011 | Tschirhart | H02M 3/3376 363/21.02 |
| 2012/0013322 | A1* | 1/2012 | Dearborn | H02M 3/156 323/283 |
| 2012/0242300 | A1* | 9/2012 | Ueno | H02M 3/156 323/234 |
| 2012/0249093 | A1* | 10/2012 | Grbo | H02M 3/1588 323/234 |
| 2013/0038310 | A1* | 2/2013 | Menegoli | H02M 3/156 323/288 |
| 2013/0057237 | A1* | 3/2013 | Chen | H02M 3/1584 323/271 |
| 2013/0229829 | A1* | 9/2013 | Zhang | H02M 3/33569 363/16 |
| 2014/0008981 | A1* | 1/2014 | Asai | H02M 3/33507 307/31 |
| 2014/0016362 | A1* | 1/2014 | Adragna | H02M 3/3376 363/21.02 |
| 2014/0021929 | A1* | 1/2014 | Lin | G05F 1/10 323/271 |
| 2014/0375288 | A1* | 12/2014 | Nora | H02M 3/1584 323/272 |
| 2015/0062989 | A1 | 3/2015 | Su et al. | |
| 2015/0109824 | A1* | 4/2015 | Chen | H02M 3/22 363/17 |
| 2015/0222193 | A1* | 8/2015 | Zambetti | H02M 3/33546 363/21.02 |
| 2016/0094129 | A1* | 3/2016 | Schmitz | H02M 3/158 323/271 |
| 2016/0124447 | A1* | 5/2016 | Kobayashi | G05F 1/575 323/280 |
| 2016/0187386 | A1* | 6/2016 | El-Damak | G01R 19/10 324/126 |

FOREIGN PATENT DOCUMENTS

| | | |
|---|---|---|
| CN | 201750340 U | 2/2011 |
| CN | 103081321 A | 5/2013 |
| CN | 103248226 A | 8/2013 |
| CN | 103414333 A | 11/2013 |
| CN | 103618450 A | 3/2014 |
| CN | 103874283 A | 6/2014 |
| EP | 2388902 A1 | 11/2011 |
| GB | 2495413 A | 10/2013 |
| JP | 2015043652 A | 3/2015 |

OTHER PUBLICATIONS

Chunping Song, "Optimizing Accuracy of Hysteretic Control," Power Electronics Technology, Feb. 14-21, 2006, accessed Mar. 15, 2016, http://powerelectronics.com/site-files/powerelectronics.com/files/archive/powerelectronics.com/mag/602PET20.pdf.

Nancy Zhang, Wenkai Wu, and Weidong Zhu, "D-Cap Mode With All-Ceramic Output Capacitor Application," Application Report, SLVA453—Feb. 1-8, 2011, accessed Mar. 15, 2016, http://www.ti.com/lit/an/slva453/slva453.pdf.

Sanjaya Maniktala, "Voltage-Mode, Current Mode (and Hysteretic Control)," Microsemi Analog Mixed Signal Group, Technical Note TN-203, Nov. 2012, accessed Mar. 15, 2016, http://www.microsemi.com/document-portal/doc_view/124786-voltage-mode-current-mode-and-hysteretic-control.

(56) References Cited

OTHER PUBLICATIONS

Search Report for PCT/US16/43919, dated Nov. 17, 2016 (1 page).
English Machine Translation, JP2015043652A (18 pages).
Office Action with Search Report for Chinese Patent Application No. 201680042480.5, dated Jul. 22, 2019, 4 pages.
CN103248226A, Machine Translation, 12 pages.
CN101183836A, Machine Translation, 12 pages.
CN1521931A, Machine Translation, 25 pages.
CN103081321A, Machine Translation, 14 pages.
CN103618450A, Machine Translation, 22 pages.
CN103414333A, Machine Translation, 15 pages.
CN201750340U, Machine Translation, 24 pages.
CN103874283A, Machine Translation, 17 pages.

\* cited by examiner

HYSTERETIC CONTROL FOR TRANSFORMER BASED POWER CONVERTERS

CROSS-REFERENCE TO RELATED APPLICATIONS

This application claims priority to U.S. Provisional Patent Application Ser. No. 62/195,865, filed Jul. 23, 2015, entitled "HYSTERETIC CONTROL MECHANISM FOR ISOLATED BRIDGE POWER CONVERTERS," naming Michael D. Seeman as inventor, which is hereby incorporated by reference herein in its entirety.

TECHNICAL FIELD

This application relates in general to the field of power conversion, and in particular to a hysteretic control mechanism for power converters.

BACKGROUND

Complex electronic systems commonly contain a quantity of sub-assemblies on printed circuit boards (PCBs) or other modules which are typically located and interconnected in a rack connected via a back plane, or in an enclosure connected via wire. As the core voltage of integrated circuits has continued to fall to below 3.3 Volts to 2 Volts and even less, power distribution to these sub-assemblies conventionally uses an architecture where each sub-assembly creates its own specific power, using an intermediate system power as an input. This is commonly referred to as a distributed power architecture (DPA) and it a more efficient architecture for getting regulated power to the various sub-assemblies when compared to the centralized power architectures (CPA) of prior assemblies of the past.

In a prior known approach for a DPA, the primary system power supply will receive an input voltage and reduce it to one or more intermediate system voltages to be bussed to each of the PCBs sub-assemblies. Each PCB sub-assembly typically includes a DC-DC converter that will convert the system supply voltage to one (or more) well-regulated supply voltages for the sub-assembly PCB. With the addition of power regulation, the DC-DC converters are commonly referred to as switching regulators (SRs) or point-of-load (PoL) converters. Electrical isolation may be provided by either the primary system power supply or the individual switching regulators. The switching regulator is a commonly used and versatile element allowing the various sub-assembly components to receive the power supply voltages required without requiring adding a specific voltage and buss to the system power architecture. In the case of a high current, low voltage PoL converter, such as one rated at 30 A, 1V, the PoL converter significantly reduces the line losses and cost that would otherwise be needed when distributing a 30 A current by allowing the power to be distributed as a high voltage, low current, such as 3 A, 12V to the various sub-assemblies. This approach allows the power to be distributed in a smaller sized, lower cost and lighter weight wire or buss than would otherwise be needed.

FIG. 1 depicts a distributed power architecture. DPA 100 has an input voltage 101 which feeds the system power supply 103. The system power supply is connected to a power buss 105 which, in this non-limiting, illustrative, example, distributes voltages such as 24V and 12V within the system. The DC-DC switching regulators 107a, 107b . . . 107n located on the sub-assembly PCBs (not shown) are connected to the system power buss 105 and may utilize one or both of the system power supplies. Illustrating the versatility of the onboard switching regulators, regulator 107a has outputs of 10V and 3.3 Vs; regulator 107b has outputs of 1.0V and 1.5V; and regulator 107n has a single output of 8V. In consumer and commercial electronic applications, the input voltage 101 could be 100 Vac to 240 Vac. In telecom applications, for example, where the system is run from standard battery voltages, the input voltage could be between 36 Vdc to 72 Vdc with a 48V DC input being the typical input voltage in known systems.

Progress has been made in improving the efficiency of the two stage DPA including allowing the intermediate voltage to be a semi-unregulated voltage, running in an open loop manner. This approach is disclosed in U.S. Pat. No. 7,187,562, titled "Two Stage Power Conversion Circuit" to Stojcic et. al. (the "562 patent"). As explained in the '562 patent, allowing a semi-unregulated intermediate voltage in the distributed power architecture reduces complexity of the first stage and does not have an adverse effect on the individual switching regulators on the sub-assemblies, since each sub-assembly is configured to regulate the output voltages. For the second stage switching regulators, the multi-phase buck converter has become a commonly used converter architecture for the point-of-load (PoL) converters where high currents and low voltages, such as 1V at 40 A, are required.

FIG. 2 illustrates in a simple schematic a two phase buck converter 200 with a synchronous rectifier, current doubler output stage, and a controller. FIG. 2 illustrates a buck converter 200 which is a rectifier that utilizes transistor switches Q1, Q2 as high side drivers and transistor switches Q3 and Q4 as synchronous rectifiers. The output voltage VOUT is coupled to the switching node through two inductors L3 and L4, which serve to double the output current while halving the voltage (when compared to a buck converter with a single inductor and single phase). The switching controller 201 receives output voltage information in a feedback loop which is used to allow the controller 201 to synchronously switch Q1, Q2 and to use Q3, Q4 to act as synchronous rectifiers and to regulate the output voltage or current.

Regulation modes are divided into two basic types: pulse width modulation (PWM) and hysteretic. Within the PWM type are voltage-mode control (VMC) and current-mode control (CMC) controllers. One skilled in the art will recognize that various off the shelf integrated circuits available from a number of manufacturers implement these various well known converter control modes. For example the SG3524 "Pulse Width IC" commercially available from Microsemi implements VMC, the UC3843 current mode PWM controller manufactured by Unitrode (now available from Texas Instruments Incorporated) implements CMC, and the TPS53632 integrated circuit available from Texas Instruments Incorporated implements hysteretic control.

The control mode selected depends on the requirements of the power supply, however hysteretic control inherently provides lower quiescent current and excels in extreme down conversion applications common in PoL converters today. There are several types of hysteretic control presently in use. The original hysteretic approach provided a very simple circuit with fast regulation but also with a widely varying switching frequency and a variable pulse width. Modified hysteretic control has since been developed to improve converter performance. In one example approach, a semi-fixed duration on-pulse is used to turn on a high side driver switch at each trigger event. By adjusting the duration of the pulse, and triggering the pulses based on the output voltage and on the input voltage, regulation can be achieved. Additionally, hysteretic control achieves good regulation when compared to other approaches and can provide a sufficiently fast voltage and current slew rate to supply processor cores, DSP cores and other low voltage, power hungry ICs. The use of power savings and sleep modes in integrated circuits, coupled with a very fast transition to a full voltage or high speed clocking rate, makes the need for a fast response from the PoL converter critical to system performance when supplying power to these high performance ICs. Hysteretic controllers can provide cycle by cycle control with fast response to changes in output or load conditions, making these controllers popular for providing power supplies to these advanced integrated circuits.

The two-stage approach to DPA is commonly used today because the conversion of a high input voltage (a DC input of 36-75 Volts, for non-limiting examples) to a sub 3.3V level with a single buck converter stage has a typical conversion efficiency in the low 80% range or even worse for some prior systems. As indicated in FIG. 1, a typical efficiency of the first stage system power supply is 95%-98% and a typical efficiency of the second stage switching regulators used in the prior approach converters is 90% to 95%, resulting in an overall system efficiency in the 85% to 93% range when using the two-stage approach. It is well known that for a given power level, the efficiency of the converter typically decreases with decreasing output voltage. For example, a 12V, 30 W switching regulator converter providing 6V @ 5 A would be more efficient than the same converter providing 1V @ 30 A at the output. With that in mind, the typical overall efficiency of a prior known approach low-voltage output PoL converter is normally closer to the 85% end of the overall efficiency range.

Accordingly, due to the continuing efforts to reduce the size of electronic products and to increase efficiency which is necessary to reduce component size without adversely increasing the device operating temperatures, further improvements in the size and efficiency of power converters are needed and desired.

SUMMARY

Arrangements that form aspects of the present application incorporate novel circuitry for power converters to provide highly efficient, single stage conversion from large input voltages to low voltage, high current outputs. In the arrangements, bridge topology converters such as half-bridge, and alternatively full-bridge and forward topologies, are used with a transformer situated between an input stage circuit and an output stage circuit, and hysteretic control is used to generate switching pulses for switches in the input and output stage circuits. In some arrangements a hysteretic controller integrated circuit previously used for controlling a buck converter is used, in a modified manner, to provide the hysteretic control. In some arrangements a current doubler is used in the output stage to provide the output current. In other arrangements a half-bridge input stage is used with the current doubler and the hysteretic controller. In still additional arrangements, a full-bridge input stage is used with the hysteretic controller.

In a non-limiting example arrangement, an apparatus includes a power converter for converting an input voltage to an output voltage, the power converter further including: a transformer having a primary side and a secondary side coupled between an input voltage terminal and an output voltage terminal, respectively; at least one primary side driver switch coupled to supply current from the input voltage terminal to the primary side of the transformer; at least one inductor coupled between the secondary side of the transformer and the output voltage terminal; at least one secondary side switch coupled between a node coupled to the inductor and the secondary side of the transformer and a ground potential; and a hysteretic controller coupled to supply a first on-time signal to the at least one primary-side switch and a second on-time signal to the at least one secondary side switch, the hysteretic controller having a feedback input coupled to the output voltage and configured for sensing the voltage at the output and having at least one current input coupled to the at least one inductor and further configured for receiving a signal corresponding to the current flowing in the at least one inductor.

In a further example arrangement, in the apparatus above, the power converter further includes a half-bridge converter with a current doubler output. In yet another further arrangement, in the apparatus above, the power converter further includes a second primary side driver switch coupled between the primary side of the transformer and a negative voltage input; a second inductor coupled between the secondary side of the transformer and the output voltage terminal; and a second secondary side switch coupled between a second node coupled to the second inductor and the secondary side of the transformer, and a terminal for receiving a ground potential; wherein the hysteretic controller is further configured to supply on-time signals to the second primary side driver switch and the second secondary side switch.

In still another example arrangement, the apparatus above is provided, wherein the power converter further includes two alternating cycles and the first and second inductors form a current doubler at the output voltage terminal. In still another example arrangement, in the apparatus described above, the power converter is a forward converter.

In still another example arrangement, in the apparatus described above, the hysteretic converter further includes a differential amplifier configured to compare the output voltage received to a reference voltage and to output an amplified error signal and/or a filtered droop signal, the hysteretic controller outputting the on-time signal to the at least one primary side driver switch responsive to the error signal or to the droop signal.

In a further example arrangement, in the above described apparatus, the hysteretic converter further includes a pulse sequencer to generate the at least one on-time signal to the at least one primary side driver switch responsive to a comparator that receives a voltage corresponding to average current in the at least one inductor, and the droop signal, and outputs an on-time pulse to the at least one primary side driver switch responsive to the comparison.

In still a further example arrangement, in the apparatus described above, the at least one primary side driver switch and the synchronous rectifier switch further comprise FET transistors. In still another alternative arrangement, in the apparatus described above the FET transistors further comprise silicon MOSFET devices. In yet another example arrangement, in the apparatus described above, the transistors further comprise GaN devices.

In still another example arrangement, in the apparatus described above, the power converter further comprises a hard switched full-bridge converter with a current doubler output.

In still a further example arrangement, in the above described apparatus, the hard switched full-bridge converter further comprises a second primary side driver switch coupled between the primary side of the transformer and a negative input voltage terminal, a third driver switch coupled between the input voltage terminal and the primary side of the transformer, and a fourth driver switch coupled between the primary side of the transformer and the negative voltage input terminal.

In yet another alternative arrangement, in the above described apparatus, the first and second primary side driver switches and the third and the fourth driver switch further comprise GaN transistors.

In a further example arrangement, a half-bridge transformer-based power converter includes a transformer having a primary side with a first terminal and a second terminal and a secondary side with a third terminal and a fourth terminal; a first primary side driver transistor having a current conduction path coupled between a first voltage input terminal for receiving a positive input voltage and the first terminal of the primary side of the transformer, and having a gate terminal; a second primary side driver transistor having a current conduction path coupled between a second voltage terminal for receiving a negative input voltage and the first terminal of the primary side of the transformer, and having a gate terminal; a first capacitor coupled between the first voltage input terminal for receiving the positive input voltage and the first terminal of the primary side of the transformer; a first secondary side driver transistor having a current conduction path between the first terminal of the secondary side of the transformer and a terminal for a ground potential, and having a gate input; a second secondary side driver transistor having a current conduction path coupled between the second terminal of the secondary side of the transformer and the terminal for a ground potential, and having a gate input; a first inductor coupled between the first terminal of the secondary side of the transformer and an output terminal for an output voltage; a second inductor coupled between the second terminal of the secondary side of the transformer and the output terminal for an output voltage; and a hysteretic controller coupled to the output voltage and having inputs for receiving sensed current signals for the first and second inductors, and having outputs for driving the gate signals for each of the first and second primary side driver transistors, and for driving each of the first and second secondary side transistors, configured to output on-time pulses on the gate signals of the first and second primary side driver transistors at a nearly constant switching frequency to create an output voltage at the output voltage terminal.

In a further arrangement, the half-bridge power converter described above is provided wherein the hysteretic controller further includes a first comparator for comparing the output voltage to a reference voltage and for outputting an error voltage, the error voltage can further be filtered through a dynamic filter to form the droop voltage, which will adjust the dynamic performance of the power converter.

In still another arrangement, the half-bridge power converter described above includes wherein the hysteretic controller further includes a summer configured to add the sensed current signals, and a second comparator comparing the sum of the sensed current signals to the droop voltage, and configured to output a switch signal responsive to the comparison.

In yet another arrangement, the half-bridge power converter described above includes wherein first and second primary side driver transistors each include a GaN transistor.

In another alternative arrangement, the half-bridge power converter described above wherein the first and second low side driver transistors each include a MOSFET.

In still another example arrangement, an integrated circuit includes primary side driver transistors for a transformer based power converter, and further includes a hysteretic controller circuit having output signals for driving the gate terminals of primary side driver transistors and secondary side driver transistors to form a step down output voltage converter, the hysteretic controller circuit having an input for receiving a feedback output voltage, and having inputs for receiving signals corresponding to sensed inductor currents; at least one primary side driver transistor having a current conduction path coupled between a terminal for receiving a positive input voltage and a terminal for coupling to the primary side of a transformer and having a gate input coupled to the hysteretic controller; and at least one secondary side driver transistor having a current conduction path coupled between a terminal for coupling to the secondary side of the transformer and a terminal for a ground potential, and having a gate terminal coupled to an output of the hysteretic converter; wherein the hysteretic controller is configured to output on-time pulses to the first primary side driver to control an output voltage using an approximately constant switching frequency.

In still a further example arrangement, the integrated circuit described above is provided, wherein the hysteretic controller is adapted to provide gate signals to control a hard switched half-bridge isolated power converter.

Use of the novel arrangements incorporating an transformer based topology for a power converter and using hysteretic control to provide the switching signals for the power converter enables highly efficient, single stage power converters with low output voltages and high output currents, thus reducing cost, reducing operating temperature and reducing board area, and simultaneously increasing reliability of the systems where the arrangements are used. Use of the novel arrangements allows elimination of costly intermediate stage converters that were required by the prior known solutions for power converters.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

The making and using of various example illustrative arrangements that incorporate aspects of the present application are discussed in detail below. It should be appreciated, however, that the illustrative examples disclosed provide many applicable inventive concepts that can be embodied in a wide variety of specific contexts. The specific examples and arrangements discussed are merely illustrative of specific ways to make and use the various arrangements, and the examples described do not limit the scope of the specification, nor do they limit the scope of the appended claims.

For example, when the term "coupled" is used herein to describe the relationships between elements, the term as used in the specification and the appended claims is to be interpreted broadly, and while the term "coupled" includes "connected", the term "coupled" is not to be limited to "connected" or "directly connected" but instead the term "coupled" may include connections made with intervening elements, and additional elements and various connections may be used between any elements that are described as "coupled."

An aspect of the present application provides for hysteretic control of a transformer based power converter that is configured in a manner that is similar in some characteristics to a buck or step down converter topology, however the novel arrangements further utilize a transformer that can be used reduce a high input voltage to a low voltage, while also simultaneously multiplying the current based on the turn ratio of the transformer. Utilizing the transformer for voltage reduction reduces the stress and switching inefficiencies in the high side switches which can be implemented as FET transistors. Further, as is described further below, the efficiency of this conversion is about 10% above the efficiency for a typical known prior approach single stage buck converter reducing voltages in a similar range. In sharp contrast to the prior known approaches for power distribution, use of the high efficiency, single stage PoL converter in the novel arrangements discovered by the inventor surprisingly results in eliminating the need for intermediate step down voltages, along with eliminating the corresponding cost and board area for the components used to generate and isolate the intermediate voltages. Elimination of these components also increases overall system reliability and reduces weight and size of the system. Note that the transformer based converter arrangements of the present application can also be used to form a step up converter, increasing an input voltage to a higher output voltage, and alternative arrangements formed with a step up transformer are contemplated as additional aspects of the present application, and are within the scope of the appended claims.

Figure 3:
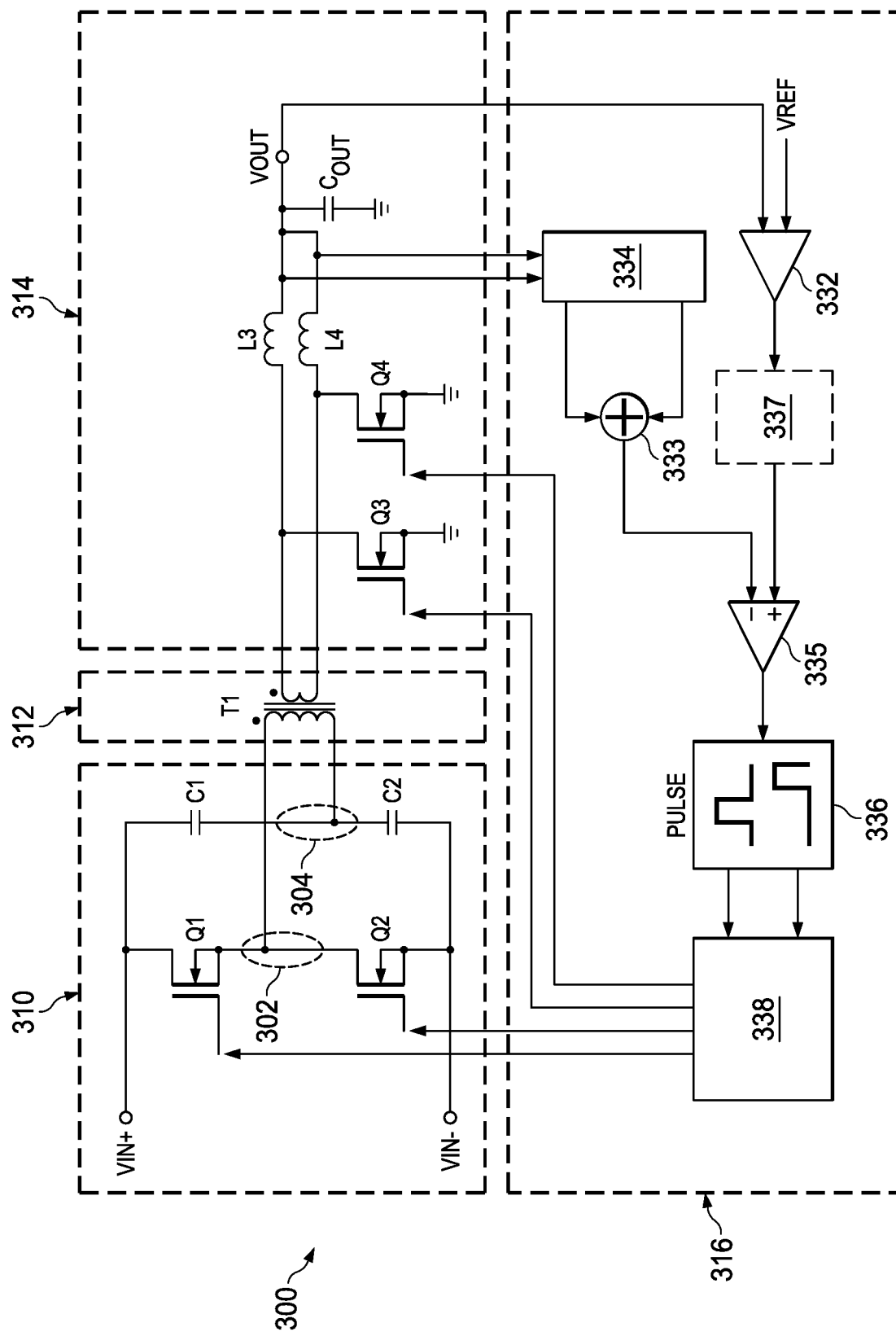
FIG. 3 is an illustration of a half bridge converter arrangement forming an aspect of the present application.

FIG. 3 illustrates in a non-limiting example arrangement a half bridge PoL converter arrangement 300 that forms an aspect of the present application. The example converter 300 is said to be "hard switched" because the transistors Q1, Q2 which are the primary side drivers for two alternating cycles of conversion, may be turned on during the converter operations with a voltage already across them, such as VIN. In FIG. 3, an input section 310 of converter 300 is coupled via transformer section 312 to an output section 314.

In FIG. 3, hysteretic control is used to supply the switch enable signals (gate signals) for FETs that form the switches Q1, Q2, Q3, and Q4. A hysteretic control section 316 receives voltage feedback from the output section. The hysteretic control section 316 provides for the regulation of the PoL converter through regulating the on and off times for switches Q1, Q2, Q3 and Q4. The hysteretic control section 316 also receives current sense inputs from the inductors L3, L4 in the output section.

The input section 310 comprises an input voltage Vin+ coupled to the drain or source terminal of a switching transistor Q1 and to the first terminal of capacitor C1. The source or drain terminal of the transistor forming switch Q1 is coupled to node 302. In an example application where the switch Q1 is implemented using an enhancement mode MOSFET transistor of the N-type, the input voltage VIN+ would be coupled to the drain, and the node 302 would be coupled to the source, of the MOSFET that forms Q1. Node 302 is also coupled to a first primary side terminal of transformer T1 and to a drain or source terminal of transistor Q2. The second terminal of C1 is coupled to node 304. Node 304 is also coupled to a second terminal on the primary side of transformer T1 and a first terminal of capacitor C2. A reference voltage Vin−, which could be a ground reference voltage for a DC input voltage, is connected to the source or drain terminal of transistor Q2 and the second terminal of capacitor C2. The capacitors C1, C2 provide current balancing between the two output inductors in the half-bridge converter topology of FIG. 3. If alternative topologies are chosen, as is further described below, the capacitors C1, C2 may not be present. For those additional alternative arrangements, current balancing can be performed by the control features of the circuitry. Note that the use of the transformer enables the power converter to be an isolated bridge converter, where the voltages on the primary side of the transformer are electrically isolated from the voltages on the secondary or output side of the transformer; however in some alternative arrangements voltage isolation is not provided. Further, the transformer can be used, as described in this non-limiting example, as a step-down voltage converter. However in alternative arrangements the transformer can be used to form a step-up voltage converter, and the illustrative examples described here are not limiting on the broader aspects of the application.

The output section 314 in FIG. 3 comprises an output terminal for the voltage VOUT which is coupled to a first terminal of output capacitor $C_{OUT}$ and to the first terminals of inductors L3 and L4. The second terminal of inductor L3 is coupled to the transformer T1 secondary side and to a drain (or source) terminal of transistor Q3. The second terminal of L4 is coupled to another terminal on the secondary side of transformer T1 and to the drain (or source) terminal of transistor Q4. The source (or drain) terminals of transistors Q3 and Q4 are connected to low side ground and the second terminal of $C_{OUT}$ is connected to low side ground.

The hysteretic control section 316 is comprised of a differential amplifier 332 which receives voltage VOUT in a feedback loop and receives or locally generates a reference voltage VREF. The output of amplifier 332, the error between the output voltage and a reference voltage, is coupled to a first terminal of a comparator 335. This output optionally may pass through a compensator block 337, shown as a dashed component to emphasize that it is optional, which may further amplify or apply a dynamic filter to the output of amplifier block 332. The second terminal of the comparator 335 is coupled to a summing block 333. In some arrangements, to further overcome noise and possible erroneous comparator results due to switching on transients, the comparator 335 can be implemented using a hysteretic comparator, which is a comparator that has a hysteresis threshold that must be overcome to trigger a change at the output, thereby reducing noise and errors. The summing block 333 is coupled to a current input block 334 which gets current sense information for both of the inductors L3, L4 from the output section 314. The comparator 335 output is coupled to a pulse sequencer 336 which is further coupled to a dead time generation block 338. The dead-time generation block is coupled to the control terminal of the four transistor switches Q1, Q2, Q3 and Q4. In the example of FIG. 3, the switches Q1, Q2, Q3, Q4 can be implemented as enhancement mode FET transistors, and the control section 316 outputs gate signals to turn on, or turn off, these transistors. In alternative arrangements, other transistor types can be used. Dead-time generation is used to prevent excess current when a primary-side transistor such as Q1 and a corresponding secondary side transistor, such as Q3, are both active at the same time. The dead time generation block 338 ensures that the switch pulses are spaced in time and that only the primary-side, or corresponding secondary side, transistor is active at a given point in time. In this example arrangement, Q3, coupled to the secondary side of the transformer, acts as a synchronous rectifier corresponding to Q1, and Q4, also coupled to the secondary side of the transformer, acts as the synchronous rectifier corresponding to Q2. Other arrangements that provide the advantages of the example in FIG. 3 will be readily apparent to those of skill in the art, and these alternative arrangements are contemplated by the inventor as providing additional aspects of the present application that are within the scope of the appended claims.

Figure 1:
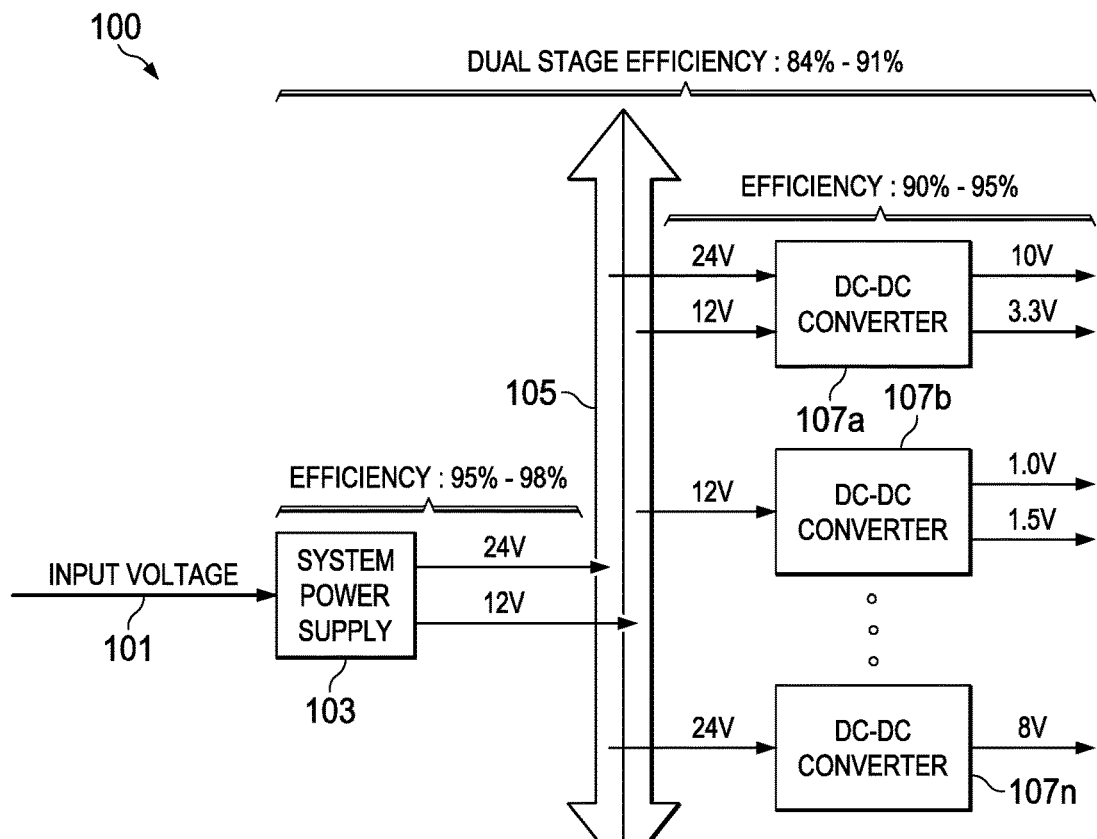
FIG. 1 depicts in a simple block diagram a distributed power architecture.
Figure 2:
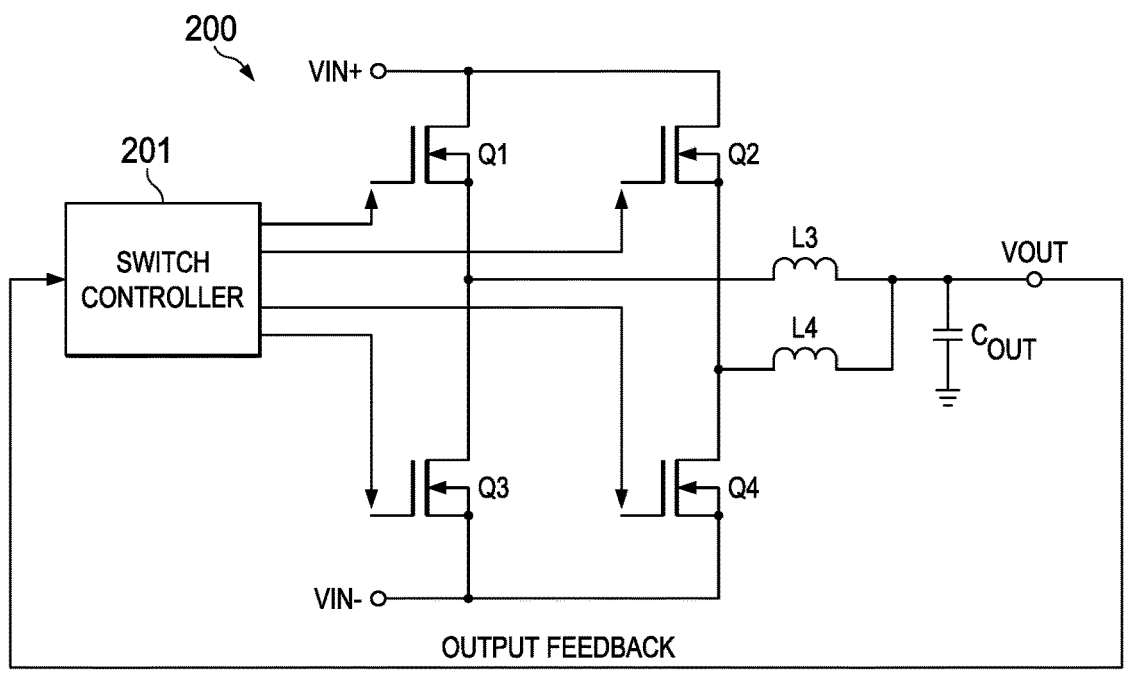
FIG. 2 illustrates a simple schematic for a prior known approach two phase buck converter and controller.

In the non-limiting example PoL converter 300 of FIG. 3, in addition to optionally providing galvanic isolation, the transformer T1 provides an efficient voltage step-down and current multiplication needed in a low voltage/high current PoL converter. Examining the converter 300 in FIG. 3, with the current doubler in the output, this PoL converter 300 can be directly compared to the two-phase buck converter topology illustrated in FIG. 2. In both examples the switching transistors Q1 and Q2 are comparable in function, and the secondary side switching transistors Q3 and Q4 are comparable in function. Lastly the output inductors L3 and L4 are treated similarly to the buck inductors in the buck converter of FIG. 2, providing current doubling and voltage halving (as compared to a single inductor output in a prior known half-bridge converter.)

In FIG. 3, the hysteretic control receives signals corresponding to current sensing in the L3 and L4 inductors through known sensing methods such as using a shunt resistor in each of the L3 and L4 lines, or alternatively, by using a resistor-capacitor filter to sense the current using direct current resistance (DCR) methods, or by measuring the $V_{DSON}$ of the low side transistors Q3 and Q4. A practitioner skilled in the art will recognize that these current sensing methods may utilize temperature compensated components to compensate for expected temperature dependent effects.

In operation, a trigger event for the selected one of the primary side drivers Q1, Q2 is determined by the comparison of a droop voltage $V_{DROOP}$ and a signal corresponding to the sum of the currents for inductors L2 and L3. The voltage $V_{DROOP}$ is an amplified, filtered error signal between the output voltage Vout and the reference voltage Vref. In operation, when the droop voltage signal exceeds the signal representing the sum of the inductor currents, a semi-fixed duration on-time pulse is sent to the switches Q1, Q2, in an alternating fashion, corresponding to the high side and low side drivers, respectively. When the specified on-time elapses, the on-time ends. The hysteretic controller 338 in FIG. 3 adjusts the on-time duration of the primary side drivers to achieve a desired steady-state frequency by monitoring the input voltage and the output voltage obtained. The converter 300 operates at an approximately fixed frequency in current conduction mode, reducing noise and putting any EMI noise at a known frequency. In this way the fast transient response of the hysteretic controller can be achieved along with acceptable EMI noise, and using controlled switching frequencies at a more or less constant frequency for a particular input voltage and output voltage level.

Figure 4:
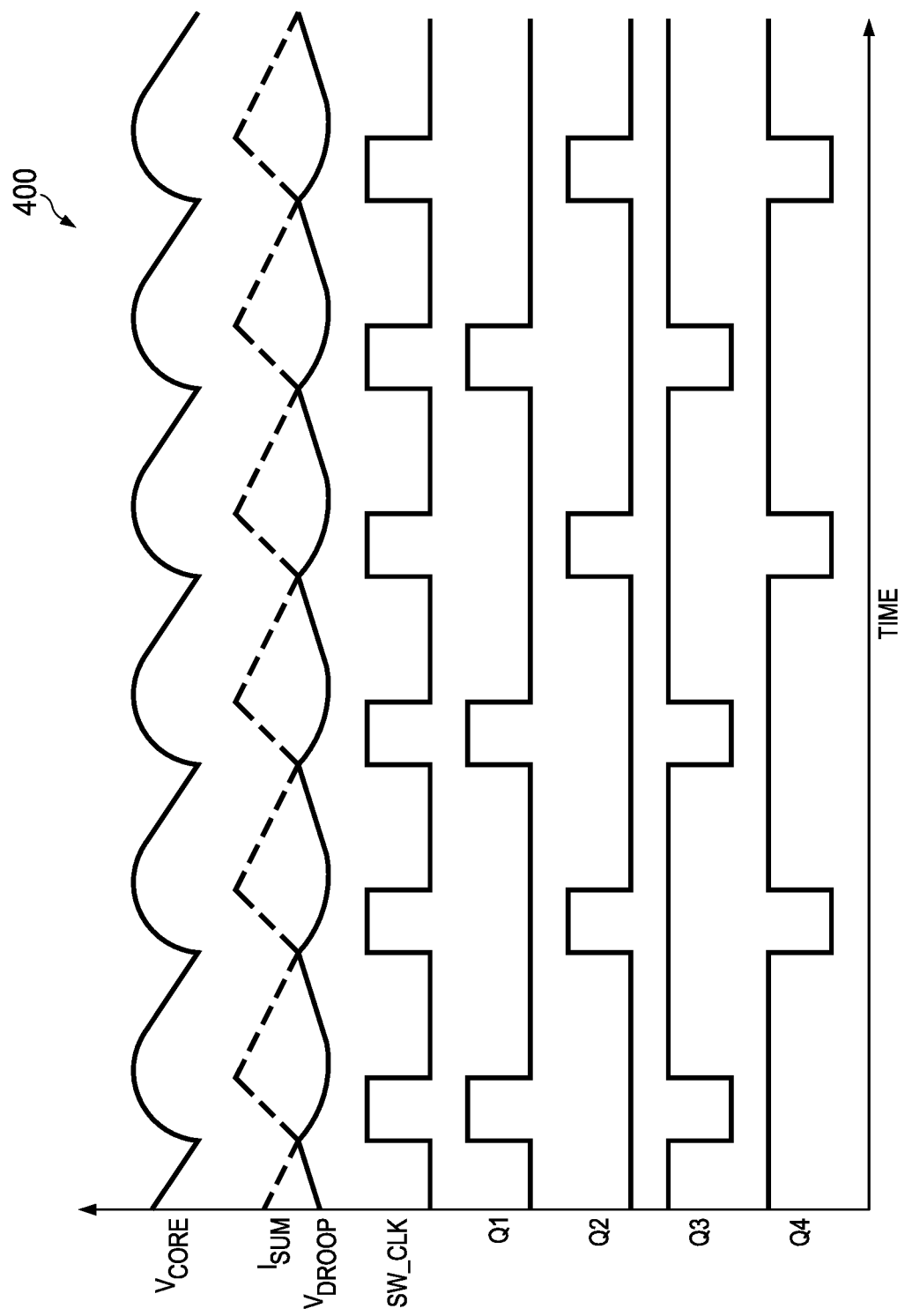
FIG. 4 illustrates in a timing diagram the use of hysteretic control in the arrangement of FIG. 3.

FIG. 4 illustrates in a simplified timing diagram 400 the operation of the hysteretic control section 316 using the droop voltage signal labeled $V_{DROOP}$, which is an amplified and filtered voltage signal corresponding to the difference between the reference voltage VREF and the observed output voltage VOUT. The controller uses $V_{DROOP}$ and the current sum signal output by the summer 333 in FIG. 3 labeled $I_{SUM}$, for example, to generate trigger events for on-time pulses for the switches. In FIG. 4, the output voltage is shown as the top trace, labeled $V_{CORE}$. The voltage $V_{DROOP}$ rises as the output voltage $V_{CORE}$ falls. A voltage corresponding to the sum, or average, of the two inductor currents $I_{SUM}$ is output by the summer 333 in FIG. 3, in FIG. 4 the trace line for $I_{SUM}$ is shown dashed to separate it from $V_{DROOP}$.

In operation, when a voltage corresponding to the inductor current sum $I_{SUM}$ crosses the voltage $V_{DROOP}$, this is a trigger event and an on-time pulse of a predetermined duration is generated by the pulse sequencer 336 in FIG. 3. This pulse is shown as SW_CLK. This on-time pulse turns on the appropriate primary-side driver (in FIG. 3, either Q1, or alternatively, Q2, in alternating cycles) to apply the input voltage to the transformer primary side. The reflected applied voltage that appears on the secondary side of the transformer will increase the current in one of the output inductors, and will charge the output voltage $V_{CORE}$. For a multiple cycle converter, the appropriate primary side driver is enabled in sequence. In FIG. 4, the gate signals to the four switches in FIG. 3 are shown, labeled Q1, Q2, Q3, and Q4. The gate signals to the primary side driver switches Q1, Q2 are driven with on-time pulses of a duration that is determined by the controller, while the gate signals to the secondary side driver switches Q3, Q4 are inverted signals with a dead time spacing; the gate signal to Q3 is the inverse of the gate signal to Q1, for example. For the example converter 300 in FIG. 3 only two primary side driver transistors Q1, Q2 are implemented, however in alternative arrangements additional primary side drivers can also be supported by adding additional high side and low side transistors and a corresponding inductor in the output section. In an alternative arrangement, additional drivers could be arranged such as a four phase arrangement formed by doubling all the power stages in parallel. These alternative arrangements are contemplated by the inventor as forming additional aspects of the present application. The pulse sequencer and dead time controller of FIG. 3 will then be configured to cycle the pulses through the phases in a cyclical fashion, allocating one on-time pulse to the appropriate primary side driver device for each cycle.

In an example arrangement, the on-time pulse duration is determined by an adaptive on time control mechanism and is proportional to the ratio of the output voltage to the input voltage, so that the switching frequency remains roughly constant regardless of variations of the input and output voltage. For a constant input voltage with a constant target output voltage VOUT, the resulting switching frequency is therefore more or less constant, making EMI noise and converter loss predictable, enabling use of the hysteretic controller to facilitate robust system design.

Returning to the non-limiting example arrangement in FIG. 3, two primary side drivers are implemented, one using primary side driver Q1 and inductor L3, and one an additional primary side driver Q2 and inductor L4. The on-time for the secondary side transistors Q3, Q4, which act as synchronous rectifiers, are complementary to the on-time signals corresponding primary-side driver transistors. The dead time circuitry 338 ensures that the primary-side driver transistors such as Q1, and the corresponding secondary-side transistors, such as Q3, will not be turned on simultaneously, operating in a manner similar to the operation of the dead time circuitry in prior known buck converter controllers. In addition, the dead time circuitry 338 also ensures that the primary-side drivers Q1 and Q2 are not turned on simultaneously. Note that the secondary-side transistors Q3, Q4 can and will be on simultaneously at different stages of the circuit operation.

In one example arrangement, a hysteretic step down controller integrated circuit labeled TPS53632G soon to be available from Texas Instruments Incorporated can be used to control the switches Q1, Q2, and to output the complementary gate signals to switches Q3, and Q4. However in an alternative arrangement, the hysteretic controller can be formed as part of a highly integrated circuit including other components such as some or all of the driver transistors Q1-Q4, and a system on a chip approach (SOIC or SOC) can be used. Other arrangements can be formed where the hysteretic controller is implemented using programmable logic such as CPLDs, FPGAs, ASICs and the like, or using programmable digital devices such as microcontrollers, DSPs, MCUs, CPUs and the like.

If an output capacitor with sufficient equivalent series resistance (ESR) is used, the hysteretic controller can operate using the ripple voltage at the output to provide the timing signal for the on-time pulses. However, in some converter implementations capacitors are used with extremely low ESR. In those applications, additional resistance such as a series resistance can be added. In alternative implementations, additional resistor and capacitor networks can be formed around the inductors to add a ripple voltage to the output voltage. Texas Instruments Incorporated provides various hysteretic controllers that use direct access to the output capacitor, referred to as "D-CAP" or "DCAP" which can be used to control the transformer arrangements of the present application with some modifications. Additional hysteretic controllers that can be used are available from Texas Instruments Incorporated and are labeled "DCAP+" and "DCAP2" type hysteretic controllers. Internal circuitry in these advanced controllers make the use of low ESR output capacitors with no or few additional external components possible. The internal circuitry can add a ripple to the feedback voltage from the output even for cases where the output capacitance has very low ESR and thus presents minimum ripple at the output. The TPS53632G device described above is an example of a "D-CAP+" type hysteretic controller.

Various manufacturers offer hysteretic or hysteretic-styled controllers for step-down or buck converters that can also be used to form additional arrangements contemplated by the inventor to control the novel half-bridge power converter arrangements. In addition, other circuit topologies using transformers can be used to form additional alternative arrangements for a single stage converter to output a low voltage, high current output, such as less than 3.5 Volts, from a relatively high supply voltage, such as an AC input of 110-240 Volts, or a DC input of greater than 30 Volts. These other topologies can also be controlled using an existing hysteretic controller chip, a programmable controller or processor, or by using dedicated circuitry for implementing hysteretic control. For example a full-bridge arrangement can be used instead of the half-bridge arrangement. In a full-bridge arrangement, the input stage of the primary side of the transformer has four symmetrically arranged driver transistors that have complementary control signals, so no additional control circuitry is required. In another alternative arrangement, the current doubler in the output stage can be replaced with a feed-forward arrangement. In this case only a single inductor may be used instead of the two inductors in the current doubler.

In an example alternative arrangement, the system 300 can be implemented using a mixed signal integrated circuit that includes, for example, the primary side and secondary side switches Q1-Q4, the hysteretic controller 316, and the capacitors C1, C2, for example. The transformer T1 and the output inductors L3, L4, can be implemented external to the integrated circuit. In this way the system 300 can be made smaller and board area can be saved. In an alternative arrangement, the mixed signal integrated circuit may include additional driver devices that are arranged to drive external switches Q1-Q4, which can be large, high power capable components such as power MOSFETs, GaN transistors, and the like.

In another alternative arrangement, the hysteretic controller 316 can be implemented as a dedicated integrated circuit similar to the TPS53632G but modified for use with the arrangements of the present application by, for example, removing functions not needed for the selected arrangement. For example, a dedicated 2-phase hysteretic controller could be implemented with fewer transistors than the up to three phase circuitry currently provided in the TPS53632G device, while retaining the hysteretic control features.

Figure 5:
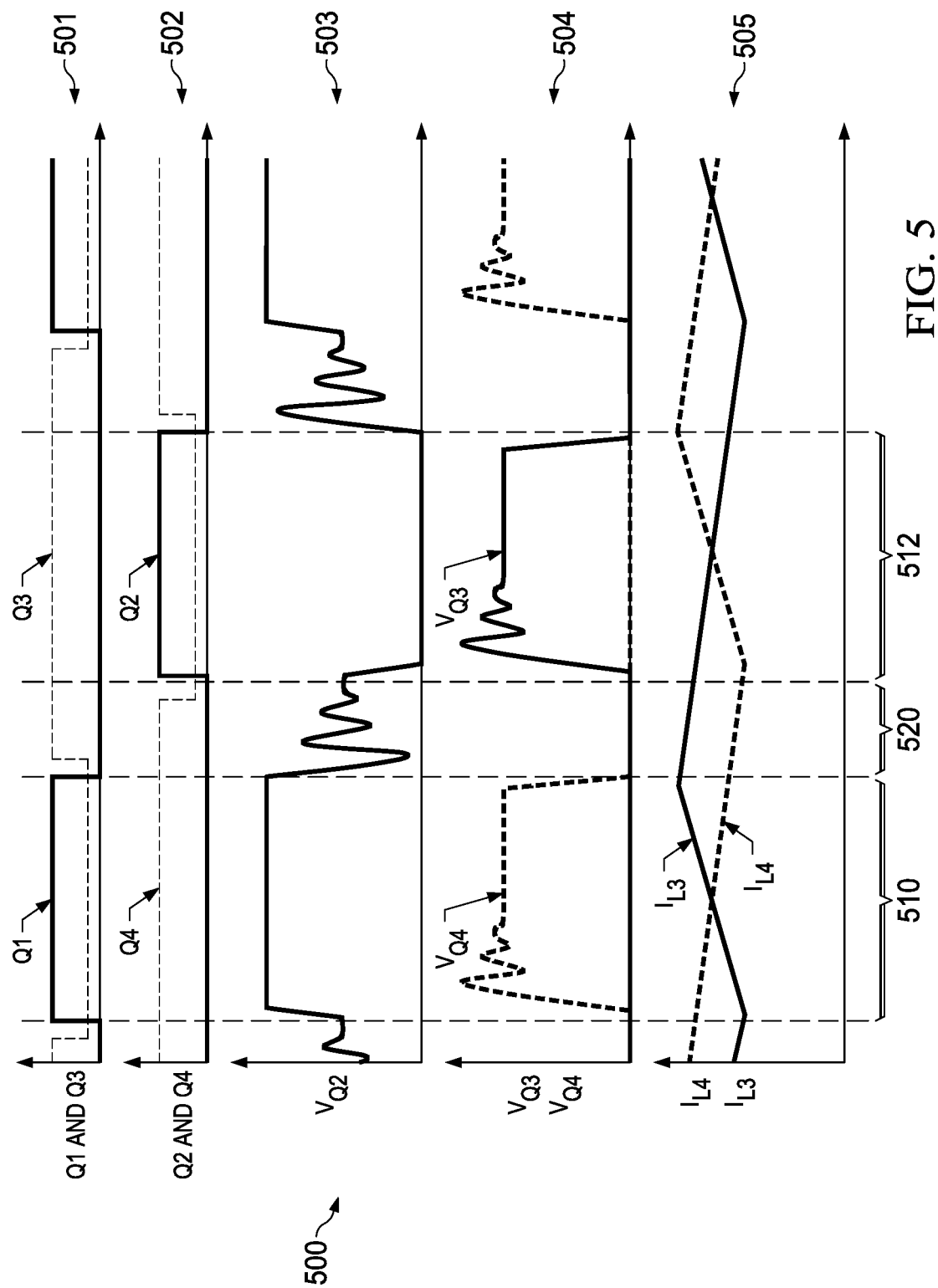
FIG. 5 illustrates a simulated timing diagram of the converter arrangement of FIG. 3.

FIG. 5 illustrates a simulated timing diagram 500 of the switches of the example hard-switched half bridge PoL converter from FIG. 3. In graph 500, the vertical axis in graphs 501, 502, 503, and 504, represent increasing voltage values. The vertical axis of graph 505 represents a voltage corresponding to inductor current. The horizontal axis on all the graphs represents increasing time, with each representing the same time values. The data in graph 501 represents the gate timing of transistors Q1 (solid line) and Q3 (dashed line) as shown in FIG. 3. The data depicted in 502 represents the gate timing of transistors Q2 (solid line) and Q4 (dashed line) shown in FIG. 3. The data depicted in 503 represents the voltage across transistor Q2 ($V_{Q2}$) shown in FIG. 3. The data depicted in 504 represents the voltage across transistors Q3 ($V_{Q3}$) and Q4 ($V_{Q4}$) shown in FIG. 3. The data depicted in 505 represents voltages corresponding to the current through inductors L4 ($I_{L4}$) and L3 ($I_{L3}$) shown in FIG. 3.

In time duration 510, the switch Q1 is turned on as shown by the positive pulse on 501, switch Q3 is complementary to the gate signal for switch Q1, while switches Q2 and Q4 remain off. $V_{Q2}$ rises to $V_{IN+}$ as indicated in 503 during time period 510. On the secondary side, $V_{Q3}$ is at zero and $V_{Q4}$ rises as shown in 504 during time period 510. The current $I_{L3}$ rises in the duration 510 while $I_{L4}$ is falling. Time duration 520 is the duration between on-time pulses during which none of the primary-side switches is on, however both secondary side transistors Q3, Q4, the synchronous rectifiers, are on during time 520. The controller ensures this time is always positive by preventing overlapping on-time pulses to prevent an undesired short between $V_{IN+}$ and $V_{IN-}$. A dead time is inserted between when a primary-side switch, such as Q1, is on and when a corresponding secondary-side switch, such as Q3, is on. This dead-time is used to prevent any primary-side switch and corresponding secondary-side switch from turning on at the same time. The leakage inductance of the transformer T1 will react with the primary side output capacitance and result in a slight oscillation observed in $V_{Q2}$ during the dead time. The inductor currents $I_{L4}$ and $I_{L3}$ are both declining during this period since no power is being applied to the primary. The following time period 512 shows transistor Q2 being turned on, since another cycle is being performed and the cycles alternate between Q1 and Q2 supplying energy to the secondary side, Q4 has a gate signal that is complementary to Q2, with Q1 being off and Q3 being on. $V_{Q2}$ goes to zero as shown in trace 503 during the time period 512. On the secondary side, $V_{Q3}$ increases as shown in 504 during the time period 512. $I_{L4}$ increases during the time that Q2 and Q4 are on. The summing of $I_{L4}$ and $I_{L3}$ at the $V_{OUT}$ node provides power to the load at that point. The controller 316 in FIG. 3 monitors the output voltage compared to a reference voltage and also monitors the sum of the currents through the inductors L3 and L4. The controller varies the duty cycle of the transistor switches to regulate the output voltage, with a longer duty cycle increasing output power and a lower duty cycle lowering the output power, that is, the on-time for the driver transistors Q1, Q2 is adapted as the output voltage (or input voltage) varies.

Figure 6:
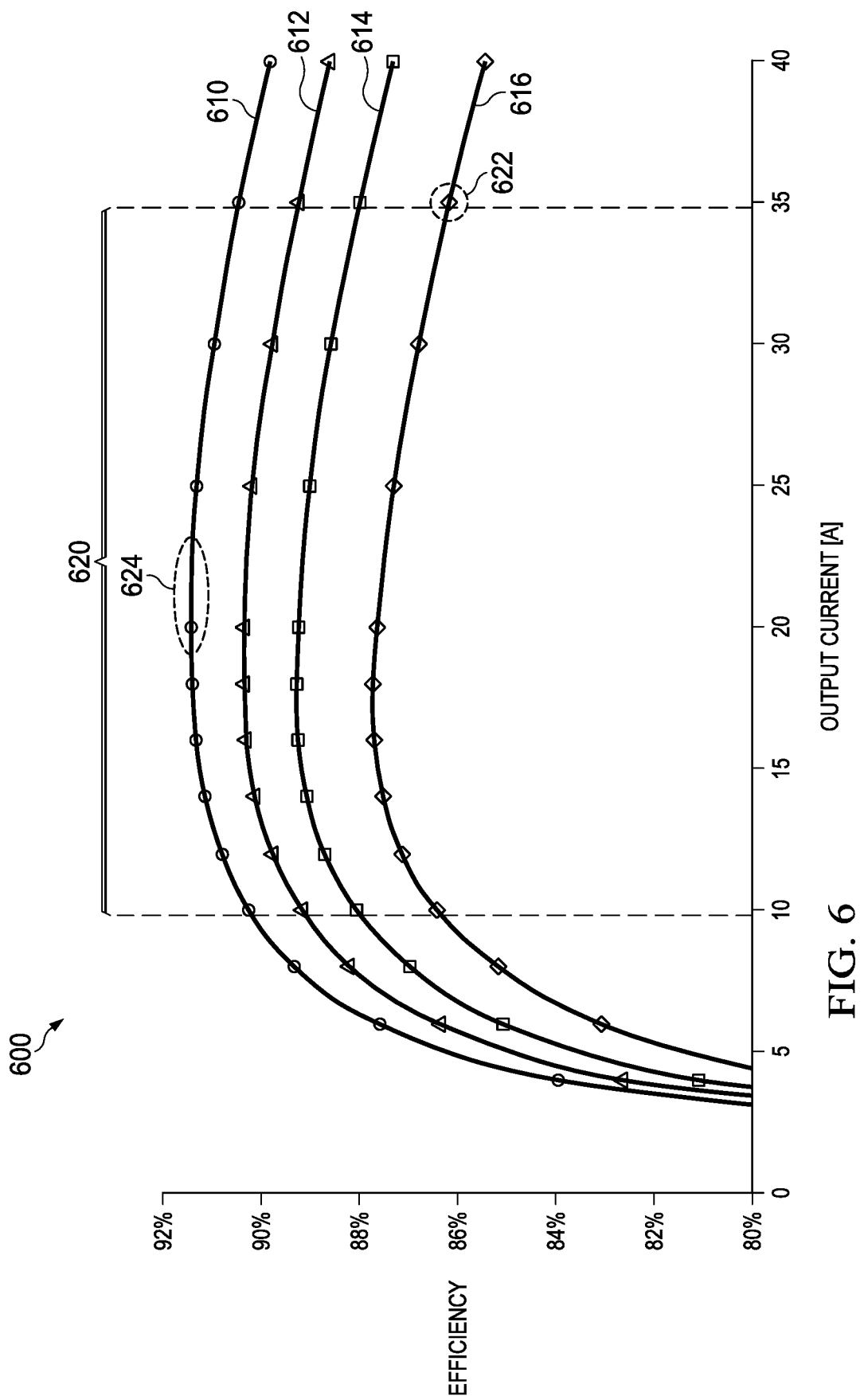
FIG. 6 is a graph of measured data illustrating the efficiency of an example half bridge converter arrangement with varying output voltages utilizing an aspect of the present application.

FIG. 6 is a graph illustrating the efficiency of an example arrangement for a hard-switched half bridge PoL converter such as shown in FIG. 3 with varying output voltages, utilizing an aspect of the present application. In the efficiency graph 600, the horizontal axis represents increasing current in amps increasing from left to right, and the vertical axis represents increasing converter efficiency moving up. Data curve 610 with circle data points represents the efficiency of the PoL converter with an output voltage of 1.5V, data curve 612 with triangle data points represents the efficiency of the PoL converter with an output voltage of 1.2V, data curve 614 with square data points represents the efficiency of the PoL converter with an output voltage of 1.0V and data curve 616 with diamond data points represents the efficiency of the PoL converter with an output voltage of 0.8V. This data was recorded with a $V_{IN+}$ of about 48V with a switching frequency of about 600 KHz. Use of the novel arrangements with hysteretic control of a half bridge converter using GaN transistors for the switches Q1, Q2, Q3 and Q4 has surprisingly enabled a single stage power converter with an input voltage of 48V, and an output voltage of less than 1.0 V at efficiencies around and greater than 90%, an efficiency that was not available in a single stage power converter using the prior known approaches.

A typical output current range for an example PoL converter of this nature is indicated by 620 and is the range of 10 A to 35 A. Curve 616 at point 622 indicates that the lowest efficiency is 86% when the output voltage was 0.8V and the best efficiency at point 624 is about 91% when the output voltage is 1.5V.

Figure 7:
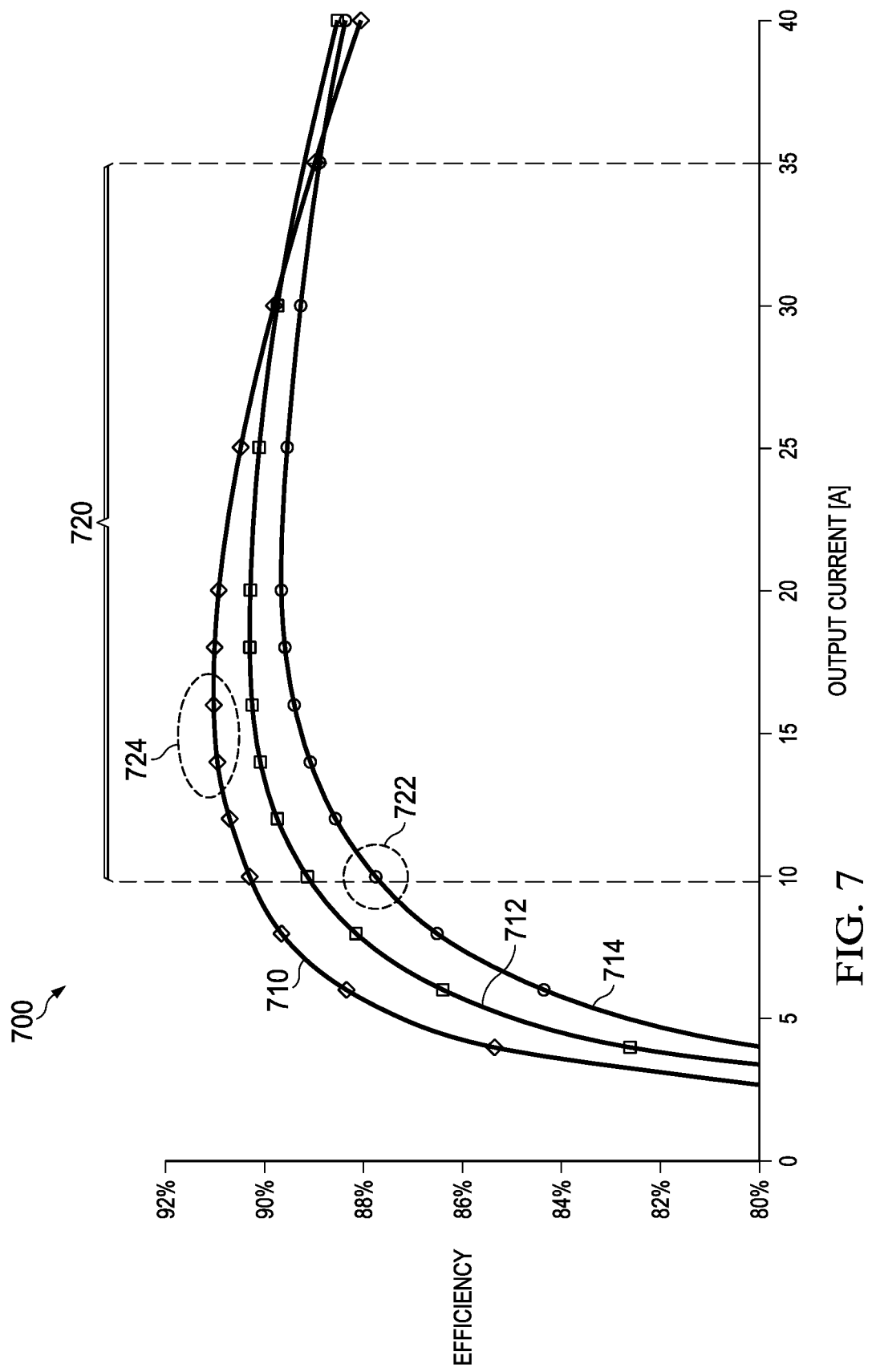
FIG. 7 is a graph of measured data illustrating the efficiency of a half bridge converter arrangement with varying input voltages utilizing an aspect of the present application.

FIG. 7 is a data graph illustrating the efficiency of a half bridge PoL converter such as shown in FIG. 3, with varying input voltages, utilizing an aspect of the present application. In the efficiency graph 700, the horizontal axis represents increasing current in amps moving from left to right and the vertical axis represents increasing converter efficiency moving up. Data line 710 with diamond data points represents the efficiency of the PoL converter with an input voltage of 36V, data line 712 with square data points represents the efficiency of the PoL converter with an input voltage of 48V and data line 714 with circular data points represents the efficiency of the PoL converter with an input voltage of 60V. This data was recorded with a $V_{OUT}$ of about 1.2V with a switching frequency of about 600 KHz. A typical current range for a PoL converter of this nature is indicated by the span labeled 720 and is the range of 10 A to 35 A. Data line 714 indicates that the lowest efficiency at point 722 is 87% found when the input voltage was 60V and the best efficiency at point 724 is about 91% when the input voltage is 36V. Again the use of the novel arrangements of the present application has surprisingly enabled a single stage converter to operate with high efficiencies while providing a low voltage, high current output from a relatively high input voltage, efficiencies not possible with a single stage converter using prior known approaches.

Figure 8:
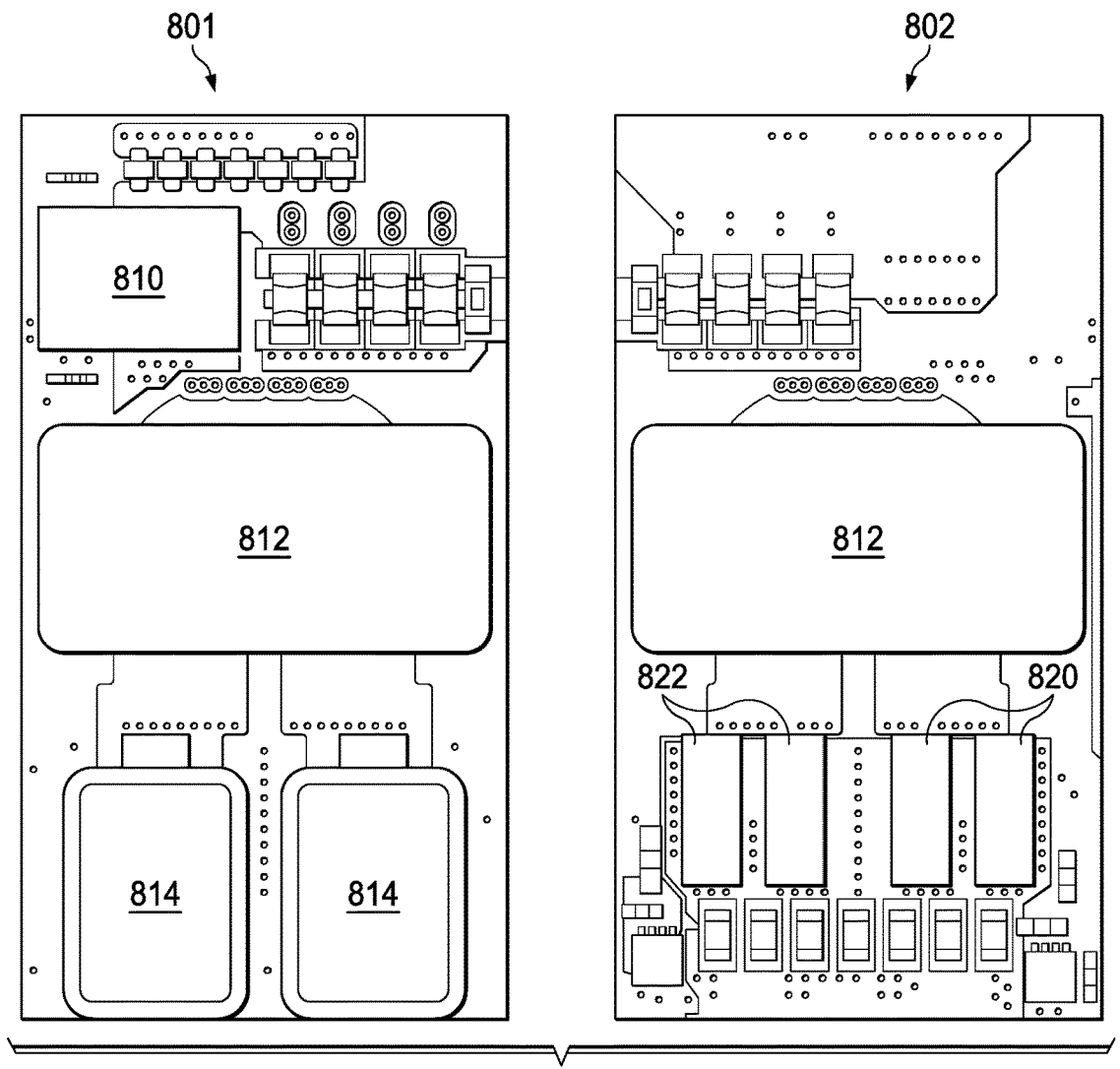
FIG. 8 illustrates a prototype device incorporating an aspect of the present application.

FIG. 8 illustrates in one non-limiting example a prototype device that forms an aspect of the present application. The top side view 801 of the prototype device contains a Gallium Nitride (GaN) half bridge integrated circuit 810 LMG5200 manufactured by and available from Texas Instruments Incorporated which forms the input stage transistors Q1 and Q2 such as shown in section 310 of FIG. 3. The primary side of transformer 812 with a 5:1 turn ratio such as shown in section 312 of FIG. 3 and a pair of output inductors 814 manufactured by Coilcraft is comparable to the inductors L3 and L4 from FIG. 3. The back side of the printed circuit board is depicted in 802 and contains the secondary side of the transformer 812 as shown as transformer T1, corresponding to section 312 of FIG. 3, a pair of 30V GaN transistors 820 utilized in parallel for secondary switch Q3 as shown in section 314 of FIG. 3 and a pair of 30V GaN transistors 822 utilized in parallel for secondary switch Q4 as shown in section 314 of FIG. 3.

This example prototype design of FIG. 8 utilizes a TPS53632G hysteretic controller manufactured by Texas Instruments Incorporated (not shown) to perform hysteretic control including on-time control to stabilize the switching frequency during steady state or continuous conduction mode conditions. Note that although in this particular example prototype GaN driver transistors are used, silicon power MOSFETs and other semiconductor transistor types such as GaAs, SiGe, and the like transistors can also be used. The arrangements herein are not limited to a particular device type for the transistors, and use of alternative types of transistors form additional alternative arrangements that form additional aspects of the present application which are contemplated by the inventor and which fall within the scope of the appended claims.

Use of the novel arrangements enable a single stage power converter to be used as an efficient point of load power supply, without the intervening intermediate stage required by the prior known approaches, for input voltages greater than 30 Volts, for example, and output voltages less than 3.5V, and as low as 1 Volt or lower, for a range of output currents, at high efficiencies. Using prior known approaches, these single stage power converters are not available at high efficiencies in such a single stage arrangement. The use of the novel arrangements disclosed in the present application thus surprisingly enables elimination of the intermediate power supply converters of the prior systems, while maintaining high efficiencies.

Figure 9:
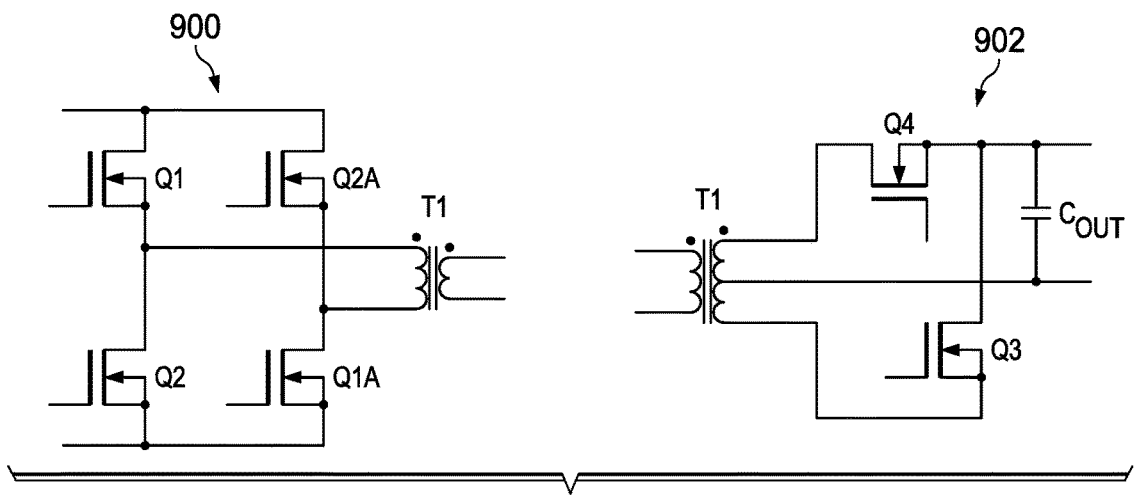
FIG. 9 depicts schematics of additional converter topologies that can be used to form additional arrangements of the present application.

FIG. 9 depicts circuit schematics 900 and 902 which illustrate portions of additional converter topologies that can be used to form additional arrangements of the present application. These input (900) and output (902) stages can be substituted for the input and output stages of the example in FIG. 3, to form a total of four possible transformer based converter topologies. Half-bridge and full-bridge converter topologies have various options for the input stage and output stage depending on the design goals of the power supply that can be used with the novel arrangements. The inventor of the present application contemplates that the portions of circuits shown in FIG. 9 and other input and output stages may be configured around a transformer in such a manner as to create an architecture that appears, in some respects, to be similar to a single or multiphase buck converter and that can therefore be controlled with a hysteretic control mechanism using the novel arrangements of the present application. One skilled in the art will recognize the full bridge input stage 900 including transistors Q1, Q1A, Q2, Q2A could be substituted for the half bridge input stage 310 of FIG. 3, for example, and the Q1A and Q2A transistor switches can be switched with the same timing of the transistor switches Q1 and Q2 from FIG. 3. Additionally, the output stage 902 could be substituted for the output stage of the half bridge PoL converter example of FIG. 3, with the Q3 and Q4 transistor switches retaining the timing of the Q3 and Q4 switches described in FIG. 3. Additional novel arrangements for using hysteretic control with an isolated converter to form a single stage PoL power supply will be discerned by one of ordinary skill in the art in view of the description above, and these additional topologies form alternative arrangements that are presently contemplated by the inventor as additional aspects of the present application, and are within the scope of the appended claims.

Figure 10:
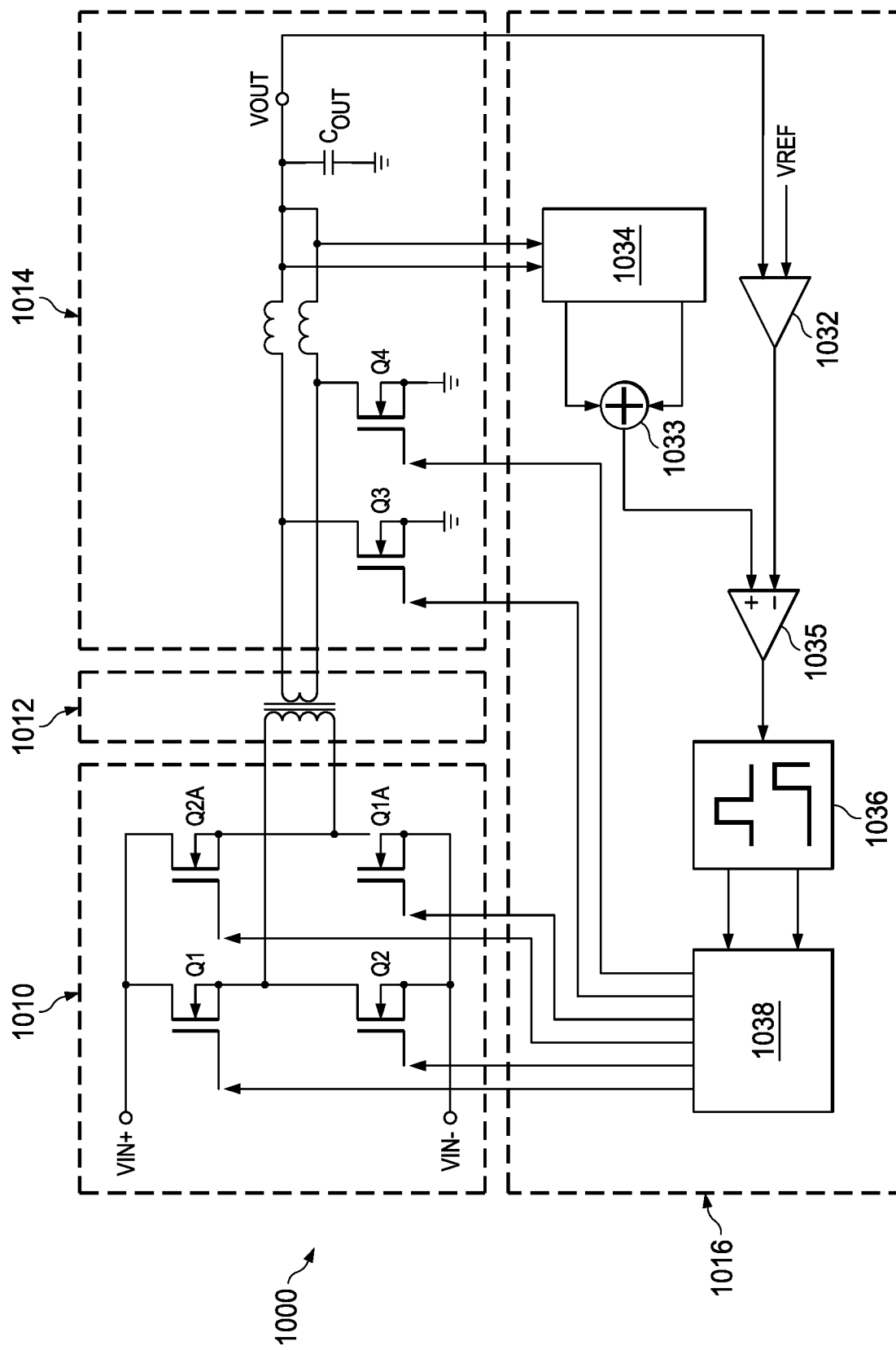
FIG. 10 depicts in a simplified circuit diagram a full bridge power converter arrangement incorporating aspects of the present application.

FIG. 10 depicts in a particular illustrative example arrangement a full bridge converter incorporating the hysteretic control of the novel arrangements to form a single stage power converter.

In FIG. 10, converter 1000 is shown in a simplified circuit diagram. In converter 1000, an input section 1010, a transformer 1012, and an output section 1014 are arranged to receive an input voltage, couple the input voltage in an isolated bridge topology, and transfer energy to the output section 1014, which in this example is shown as a current doubler such as in FIG. 3.

The novel full bridge power converter 1000 in FIG. 10 incorporates the hysteretic controller 1016 which operates as described above. The gate switching signals to the input section 1010 can be applied in a manner similar to the gate switching signals to the input section of the half-bridge topology of FIG. 3. The gate signal to the switch Q1A has the same timing as the gate signal to Q1 and has the same on-time signal. The gate signal to the switch Q2A has the same timing as the Q2 switch. Therefore the full bridge converter 1000 can be arranged using the same hysteretic control section 1016 as is used in FIG. 3 without the need for additional modification. The full bridge converter 1000 does not have the capacitors C1, C2 used in the half bridge converter 300 in FIG. 3. As a result the inherent current balancing of the half bridge converter topology of FIG. 3 is not present in the converter 1000, and active current balancing by the controller will need to be performed. In one example approach, the current balancing can be accomplished by using the techniques disclosed in U.S. Pat. No. 7,903,435, issued Mar. 8, 2011, entitled "Current Balancing for Multi-Phase Converters", to Carpenter et. al., which is hereby incorporated by reference herein in its entirety. By sensing current in each of the inductors in the current doubler, the on-time signals to the switches Q1, Q1A, Q2, Q2A and Q3 and Q4 can be varied to balance current between the cycles.

Figure 11:
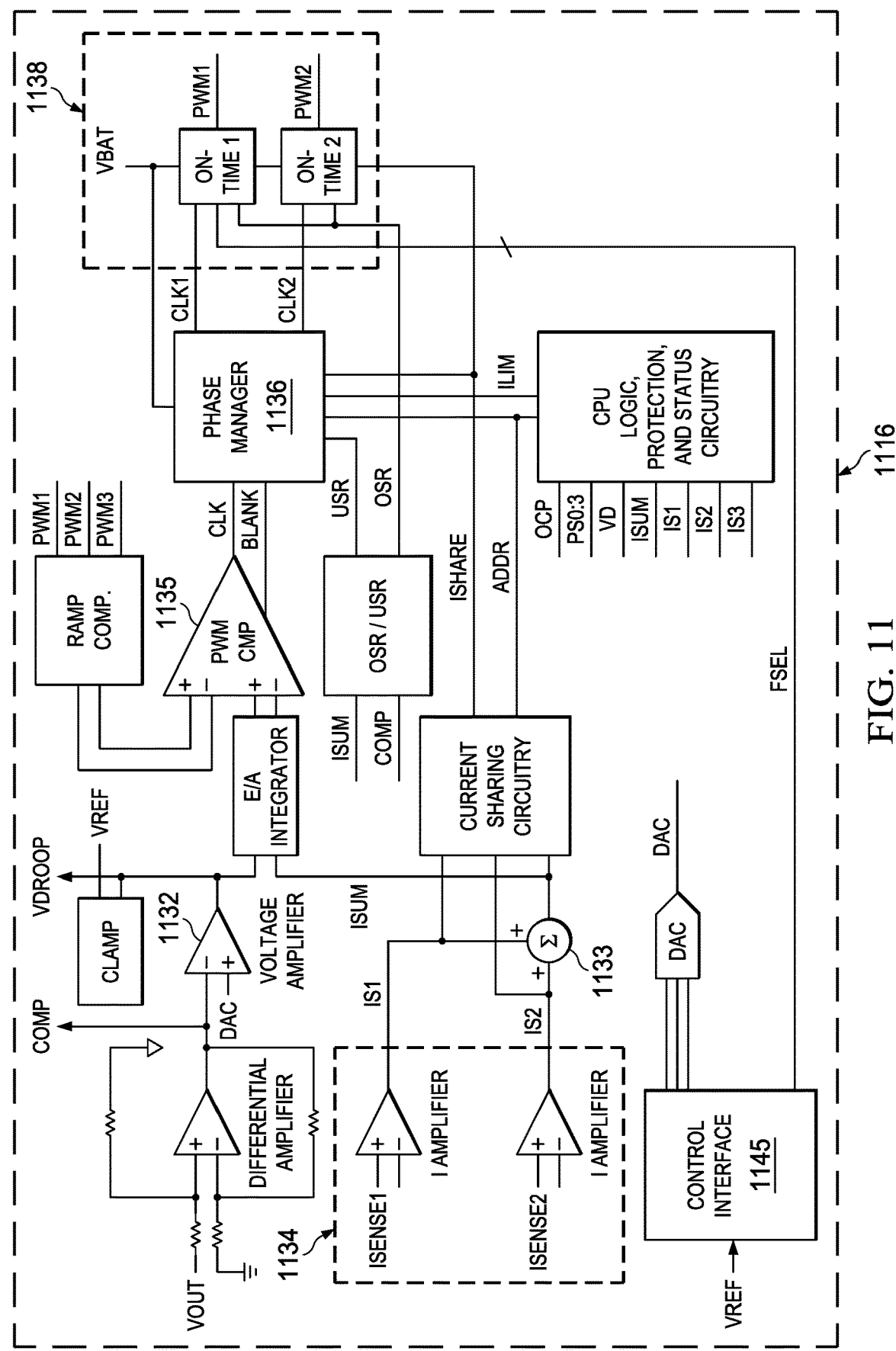
FIG. 11 depicts in a simplified block diagram a hysteretic controller circuit that can be used with the arrangements of the present application.

FIG. 11 illustrates in a simplified block diagram the details of an example hysteretic controller 1116. This can be implemented as an integrated circuit, for example, or as discrete circuitry; in addition portions of 1116 could be integrated together while other portions remain discrete, as additional possible alternative arrangements. Software and hardware combinations can be used to implement the blocks of FIG. 11. For the blocks of FIG. 11 that are also described as part of FIG. 10, the block numbers are kept the same except that the block numbers now start with "11" instead of "10". In FIG. 11, a reference voltage is input to a control interface 1145, and a digital to analog converter labeled DAC outputs an analog reference voltage DAC. A differential amplifier receives and filters the output voltage Vout, which is compared to the reference voltage signal DAC at an amplifier 1132 and outputs the result as signal VDROOP. The current sense signals ISENSE1 and ISENSE2 are input to a block 1134 and output to summer 1133, which outputs the signal ISUM. The voltage VDROOP and the summed current signal ISUM are compared at comparator 1135 and when a trigger condition exists as described above, a clock signal CLK is output. A phase manager 1136 outputs a clock to the currently active driver circuit in pulse generator 1138, which receives the input voltage VBAT and determines the duration of an on-time signal output as PWM1 for switching transistor Q1, and PWM2 to switching transistor Q2, using the ratio of the output voltage VOUT to the input VBAT, as described above, in response to a trigger event. A frequency select signal FSEL is also used to output the pulses at a constant predetermined frequency.

In addition, the novel aspects of the present arrangement can be applied to other converter topologies such as forward converter topologies. A hysteretic controller can be adapted to control a forward converter to provide a single stage power converter that is highly efficient. Because in this arrangement, only a single switch is used in the input section, only a single phase on-time signal is needed. Also, because only a single inductor is present in the output section for these topologies, no current averaging is needed.

Various modifications can also be made in the order of steps and in the number of steps to form additional novel arrangements that incorporate aspects of the present application, and these modifications will form additional alternative arrangements that are contemplated by the inventors as part of the present application and which fall within the scope of the appended claims.

Although the example illustrative arrangements have been described in detail, it should be understood that various changes, substitutions and alterations can be made herein without departing from the spirit and scope of the present application as defined by the appended claims.

Moreover, the scope of the present application is not intended to be limited to the particular illustrative example arrangement of the process, machine, manufacture, and composition of matter means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding example arrangements described herein may be utilized according to the illustrative arrangements presented and alternative arrangements described, suggested or disclosed. Accordingly, the appended claims are intended to include within their scope such processes, machines, manufacture, compositions of matter, means, methods, or steps.

What is claimed is:

1. An apparatus, comprising:
   a power converter including:
      a transformer having a primary side interfacing an input voltage terminal, and a secondary side interfacing an output voltage terminal;
      a primary side switch coupled between the input voltage terminal and the primary side of the transformer;
      an inductor having a first terminal coupled to the secondary side of the transformer, and a second terminal coupled the output voltage terminal;
      a secondary side switch coupled between the first terminal of the inductor and a ground terminal; and
      a hysteretic controller having:
         a hysteretic comparator including a first input, a second input, and an output, the first input configured to receive a sensed current from the inductor, the second input configured to receive a differential voltage representing a potential difference between an output voltage at the output voltage terminal and a reference voltage;
         a pulse sequencer coupled to the output of the hysteretic comparator; and
         a dead-time generation circuit configured to provide a first on-time signal to the primary side switch and a second on-time signal to the secondary side switch based on a pulse signal received from the pulse sequencer.

2. The apparatus of claim 1, wherein the power converter comprises a half-bridge converter with a current doubler output.

3. The apparatus of claim 2, wherein the power converter comprises:
   a second primary side switch coupled between the primary side of the transformer and a negative voltage input;
   a second inductor having a first terminal coupled to the secondary side of the transformer, and a second terminal coupled to the output voltage terminal; and
   a second secondary side switch coupled between the first terminal of the second inductor and the ground terminal;
   wherein the dead-time generation circuit of the hysteretic controller is configured to provide third and fourth on-time signals to the second primary side switch and the second secondary side switch respectively.

4. The apparatus of claim 1, wherein the hysteretic controller includes a differential amplifier having a first input coupled to the output voltage terminal, a second input coupled to receive the reference voltage, and an output coupled to the hysteretic comparator to provide the differential voltage.

5. The apparatus of claim 1, wherein the first input terminal of the hysteretic comparator is configured as a negative input terminal, and the second input terminal of the hysteretic comparator is configured as a positive input terminal.

6. The apparatus of claim 1, wherein the hysteretic controller includes a compensation circuit coupled to the second input terminal of the hysteretic comparator.

7. The apparatus of claim 1, wherein the hysteretic controller includes a summing circuit coupled to the first input terminal of the hysteretic comparator to provide a summed current as the sensed current.

8. The apparatus of claim 1, wherein the primary side switch and the secondary side switch each includes a field effect transistors (FET).

9. The apparatus of claim 8, wherein the FET includes an enhancement mode FET.

10. The apparatus of claim 1, wherein the primary side switch and the secondary side switch each includes a gallium nitride (GaN) device.

11. The apparatus of claim 1, wherein the power converter comprises a full-bridge converter with a current doubler output.

12. The apparatus of claim 11, wherein the full-bridge converter comprises a second primary side switch coupled between the primary side of the transformer and a negative input voltage terminal, a third primary side switch coupled between the input voltage terminal and the primary side of the transformer, and a fourth primary side switch coupled between the primary side of the transformer and the negative input terminal.

13. The apparatus of claim 12, wherein the first, second, third, and fourth primary side switches each includes a gallium nitride (GaN) transistor.

14. A half-bridge transformer-based power converter; comprising:
   a transformer having a primary side with a first terminal and a second terminal and a secondary side with a third terminal and a fourth terminal;
   a first primary side transistor coupled between a first voltage input terminal and the first terminal of the primary side of the transformer, and having a gate terminal;
   a second primary side transistor coupled between a second voltage input terminal and the first terminal of the primary side of the transformer, and having a gate terminal;
   a first secondary side transistor coupled between the third terminal of the secondary side of the transformer and a ground terminal, and having a gate terminal;
   a second secondary side transistor coupled between the fourth terminal of the secondary side of the transformer and the ground terminal, and having a gate terminal;
   a first inductor coupled between the third terminal of the secondary side of the transformer and an output voltage terminal;
   a second inductor coupled between the fourth terminal of the secondary side of the transformer and the output voltage terminal; and
   a hysteretic controller having:
      a hysteretic comparator including a first input, a second input, and an output, the first input configured to receive a sensed current from the first and second inductors, the second input configured to receive a differential voltage representing a potential difference between an output voltage at the output voltage terminal and a reference voltage;

a pulse sequencer coupled to the output of the hysteretic comparator; and a dead-time generation circuit configured to provide first, second, third, and fourth on-time signals to the first and second primary side transistors and the first and second secondary side transistors based on a pulse signal received from the pulse sequencer.

15. The half-bridge power converter of claim 14, wherein the hysteretic controller comprises a differential amplifier having a first input coupled to the output voltage terminal, a second input coupled to receive the reference voltage, and an output coupled to the hysteretic comparator to provide the differential voltage.

16. The half-bridge power converter of claim 14, wherein the hysteretic controller comprises a summer coupled to the first input terminal of the hysteretic comparator, the summer configured to add the sensed currents from the first and second inductors.

17. The half-bridge power converter of claim 14, wherein the first and second primary side transistors each comprises a gallium nitride (GaN) transistor.

18. The half-bridge power converter of claim 14, wherein the first and second primary side transistors each comprises a MOSFET.

19. The half-bridge power converter of claim 14, wherein the hysteretic controller includes a compensation circuit coupled to the second input terminal of the hysteretic comparator.

20. The half-bridge power converter of claim 14, further comprising:

a first capacitor coupled between the first voltage input terminal and the second terminal of the primary side of the transformer; and a second capacitor coupled between the second voltage input terminal and the second terminal of the primary side of the transformer.

* * * * *